Nov. 5, 1963  J. A. KNOWLTON, JR., ETAL  3,109,931
METHOD AND APPARATUS FOR UNIFORMLY IRRADIATING
AN OBJECT WITH ELECTRONS
Filed June 20, 1960  4 Sheets-Sheet 1

INVENTORS.
JAMES A. KNOWLTON Jr.
RICHARD H. ARNDT
BY

*Irving Kayton*

ATTORNEY

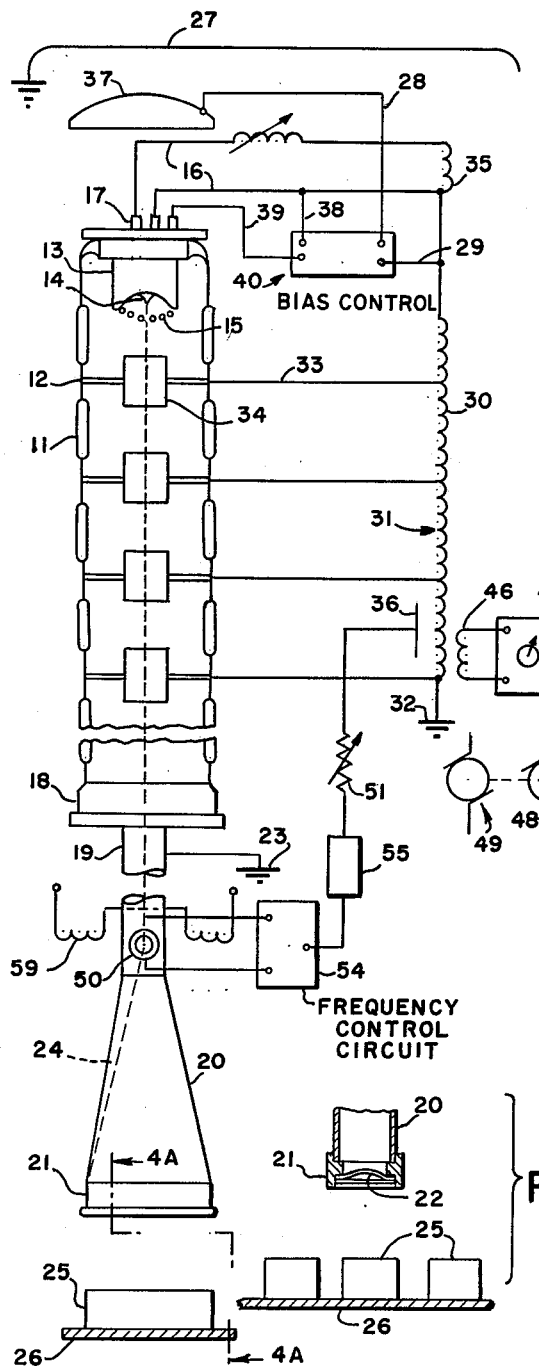
FIG. 4
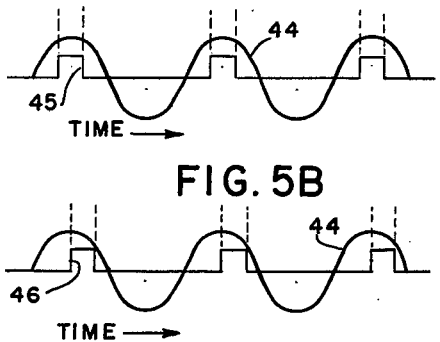
FIG. 5A
FIG. 5B
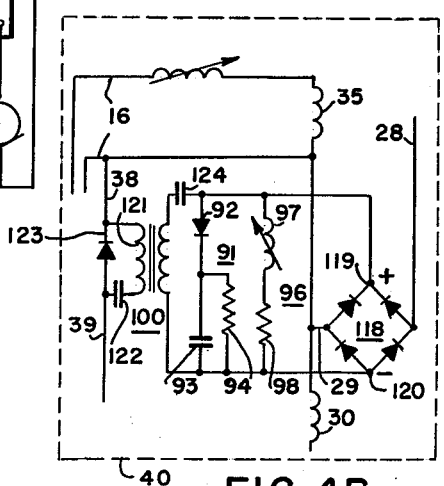
FIG. 4A
FIG. 4B
INVENTORS.
JAMES A. KNOWLTON Jr.
RICHARD H. ARNDT
BY Irving Kayton
ATTORNEY

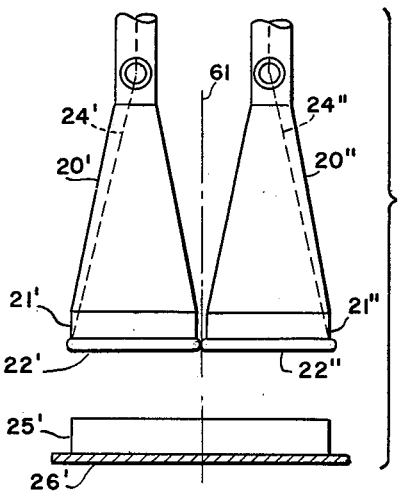
FIG. 6
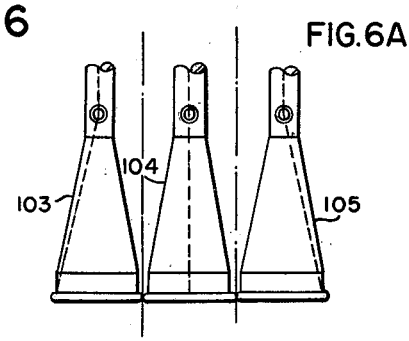
FIG. 6A
FIG. 7
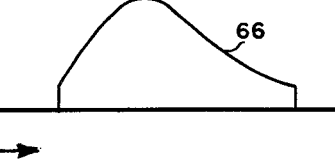
FIG. 8
FIG. 9

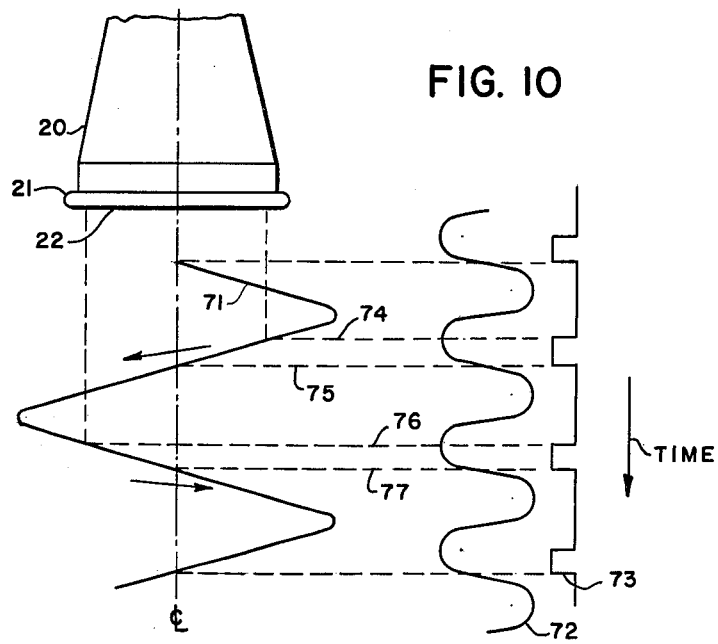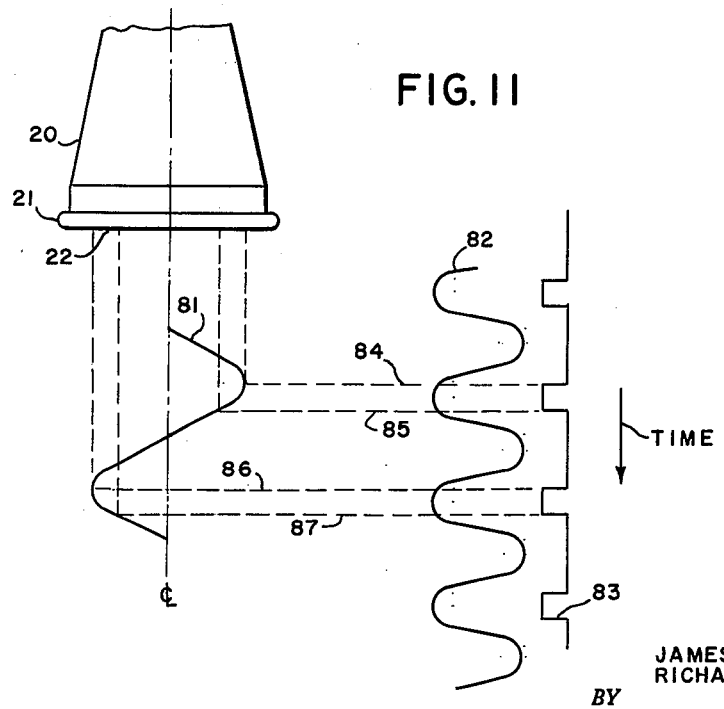

United States Patent Office 3,109,931
Patented Nov. 5, 1963

3,109,931
METHOD AND APPARATUS FOR UNIFORMLY IRRADIATING AN OBJECT WITH ELECTRONS
James Albert Knowlton, Jr., and Richard Harold Arndt, Milwaukee, Wis., assignors to General Electric Company, a corporation of New York
Filed June 20, 1960, Ser. No. 37,360
19 Claims. (Cl. 250—49.5)

This invention relates to apparatus for accelerating charged particles within an evacuated tube and emitting them through a window as a beam which impinges upon and usefully irradiates any object disposed in the beam path. More particularly, the present invention pertains to method and means for scanning the beam over the window and object to obtain preferentially uniform beam energy distribution over the object.

The principles of the present invention are applicable to various accelerators of either positively or negatively charged particles, but the invention will be described primarily in connection with an electron beam generator as a preferred embodiment.

Electron beam generators usually employ a long insulating evacuated tube for accelerating the electrons across a large potential difference existing between an electron gun including a hot cathode emitter at one end of the tube and an anode at the other. The anode includes an electron permeable window through which the beam passes from the tube onto a substance or object being irradiated. The beam is focused in the tube so as to create a beam diameter on the window in the range of 1 cm. in diameter which generally increases as it emerges to the atmosphere as the result of electron scattering in the window and from encountering atmospheric gas particles. Inevitably, the electron density is greatest near the beam center and appreciably attenuated near its margin.

Not only does the electron current density differ over adjacent increments of a beam cross section, but the various electrons are not, ordinarily, monoenergetic. The energy differences result from slight variations in the accelerating voltage amplitude. Consequently, a substance or object subjected to electron irradiation may undergo varying amounts of ionization or dosage at different depths and over different surface zones.

In order to distribute the available ionizing energy from an electron beam, it has been proposed to scan the beam lengthwise and crosswise of the window by conventional electrostatic or electromagnetic deflecting means. In some generators, where the beam is pulsed and where the accelerating potential varies sinusoidally over the pulse duration, as is the case where a resonant transformer is used, it has been customary to create a deflecting field which causes the beam to start moving lengthwise from the same point on the window and to terminate at the same point for each successive current pulse. Stated in another way, it is the practice to initiate successive pulses when the time varying deflecting voltage flux has the same magnitude and to terminate the pulses when the deflecting flux has the same magnitude. When the deflecting flux is sinusoidal, an attempt is usually made to time the pulses for coincidence with the linear part of the deflection sine wave such as is approximated by going from a positive to negative value on the flux wave. The purpose of this is to move the beam with nearly linear velocity or with a slight retardation near the ends of the scan. This is accomplished by choosing the scan frequency properly and by phasing the pulse such as to endure while the scanning flux wave goes slightly onto the sharply curved parts of the sine wave existing near its peaks. Then a build-up of electrons is obtained at the window ends and the usual decline in beam current intensity near the beginning and end of each pulse is compensated. All this to the end that there be equal electron density distribution across the scanned portion of the window. Such an arrangement is disclosed in a copending application of Harold T. Boeker, Serial No. 820,824, filed June 16, 1959, now U.S. Patent No. 2,977,500, issued March 28, 1961, and having an assignee common to the instant patent application.

While moving a beam diameter over the window repeatedly in the same pattern and at linear velocity is satisfactory in some applications, it is disadvantageous in other cases, because the maximum beam current intensity and the peak accelerating voltage always occur when the beam is in the same position on the window. The result of this is overheating and often melting the window, overdosing the substance being irradiated in the zones where current maximums are repeated, underdosing other portions of the substance, and varying the degree of beam penetration. The peak current zones determine the maximum current rating of the window, and indeed, the generator itself. They also have a bearing on the amount of window cooling that is necessary and on the window energy losses.

When the beam pulse is skewed or asymmetric, the overheating problem may be decreased by deflecting successive beam pulses across the window in alternate directions, In this way, maximum beam current intensity and peak accelerating voltage occur at two positions alternately, and heating of the window is more dispersed. Such an alternating arrangement is also disclosed in detail in the above mentioned copending application of Harold T. Boeker.

The initial premise or entering argument in the above mentioned patent application and, indeed, in all of the prior art, has been that monotonic loading, i.e., an even or flat uniform electron density distribution across the window, results in an even or uniform electron density across the plane of the irradiated object, and as a consequence, a uniform penetration across the object. It has been discovered, however, that this supposition is only correct for certain special circumstances and unfortunately is in error for many other practical operating conditions. When the substance or object irradiated is of the type such that is passes below the window of a one million electron volt tube at a very small distance from the window, e.g., one inch or thereabouts, then it is often the case that the electron density distribution at the object is substantially the same as that across the window. However, in accordance with the investigation resulting in the instant invention, it has been ascertained that for distances greater than the bare minimal distances from the window, the monotonic quality of the electron density distribution is very rapidly lost; indeed, the greater the distance of the object from the uniformly loaded window, the greater the variation of the electron beam distribution across the object. As a consequence, efforts designed to provide uniform loading of the tube window are fruitless when the irradiated object is to pass under the window at a considerable distance therefrom.

The electron density distribution changes as a function of distance from the tube window because of the scattering effect resulting from collisions between the electrons of the beam and the content of the air between the window and the irradiated object. The collisions of the electrons with molecules and particles in the air results in a scatter pattern that is determined by the deflection path probabilities characteristic of the collisions. The collisions of electrons with particles in the window or air are essentially isotropic in the sense that all possible directions of deflection are equally likely, except that there is a dominant component in the direction of the beam due to the initial velocity of the electrons. Translated into an observable effect, this means that each possible direction of deflection experiences, over any reasonable period of time, the same number of electrons traveling in that direction after collision, as every other possible direction of deflection. It follows, therefore, and has been verified experimentally, that with a monotonic electron density distribution in the plane of the tube window, the result of traversing a substantial distance through the air to a plane below the window is a density distribution having an increased density in the center of the distribution and a much smaller density at the edges. This is a consequence of the fact that the center of the distribution has deflected electrons contributed to it from both sides, while each end of the distribution can only have deflected electrons contributed from that side of the end where the distribution exists, and not from that side beyond the edge of the tube window. The electron density distribution, therefore, has a maximum at its center and decreases in magnitude toward both ends with increasing slope. It is also the case that the penetration of such an electron beam follows a similar type of distribution. The non-linearity of the electron density distribution increases with distance from the window, it being understood that at very short distances from the window, the uniform distribution is retained, while at greater distances from the window, the consequences of electron scattering become progressively more noticeable.

Since, from a practical point of view, the shape of the electron density distribution is of primary importance at the irradiated object, an entirely new approach to the subject of tube window loading had to be taken, and was taken in accordance with the principles of the invention.

It is the primary object of this invention to uniformly irradiate an object with a beam of charged particles, at any desired practical distance below the plane of the window of the device generating the beam.

It was discovered that a non-uniform electron density distribution across the tube window is required in order to provide a uniform or monotonic electron density distribution in the plane of the irradiated object located several inches below the tube window, and that the non-uniform distribution across the window must be of a very special type. Since it has been ascertained that it is characteristic of the electron scattering effect that the center of the electron density distribution always increases with distance from the window, it is in accordance with the principles of the invention that the electron density distribution provided across the window be such that the density is least at the center of the window, and increases in density toward the edges of the window. Propagation of this type of electron beam, i.e., having such a distribution at the tube window, into the atmosphere results in an increase in electron density (as a consequence of isotropic scattering) in the center of the distribution until, in the plane of the irradiated object, the center of the distribution achieves a magnitude equal to the two portions adjacent to the center, which have decreased from their prior magnitude. By properly shaping the non-uniform electron density distribution across the window of the electron beam generator in relation to the distance of the irradiated object from the plane of the tube window, irradiation of an object is achieved with a uniform electron beam distribution across it, and uniform penetration capabilities.

In accordance with the principles of the invention, the required window distribution has a density small in the center, and builds up in the direction toward the ends of the window. In a first embodiment of the invention, this separation of two high density electron concentrations is provided by utilizing two literally separate and distinct electron beam generators. The two tubes are disposed side by side, relative to the object to be irradiated, and two individually bunched but spatially separated electron beams are projected on to the object in adjacent relation. This effectively provides the type of electron distribution required such that after passing through the atmosphere the specified distance to the object, the scattering of the electron beam results in a single, even electron density distribution irradiating the object from the two separate electron beam tubes.

In accordance with a second embodiment of the invention, the required separation of two high density electron concentrations in the plane of the window is provided with a single electron generating tube having a feature providing a virtual or apparent double source of electrons. This feature is a means for deflecting the electron beam such that successive pulses or bursts of electrons appear on alternate sides of the center line of the tube window. Since the successive electron bursts are spaced from each other on, and from the center of, the window, the scattering of the electron beam below the window serves to level out the density distribution.

The disposition of two virtual sources of electron beams on opposite sides of the window centreline may be achieved by deflecting the electron beam at a certain frequency relative to the electron accelerating voltage, and by phasing it properly such that for a sweep from right to left across the window, a first burst of electrons is deflected from right to left on the right-hand side of the window, and for the next succeeding sweep across the window, the succeeding burst of electrons is swept from left to right on the left-hand side of the window. In this way, there is a minimum in the electron density distribution at the center of the window. The frequency relation most effective for providing such an arrangement is one wherein the beam sweep or deflection voltage has a frequency equal to one-half that of the accelerating voltage of the electron beam generator. However, depending upon the pulse width relative to the accelerating voltage period, other sweep frequencies which are odd integral multiples of one-half the accelerating voltage frequency may provide the desired alternation of the sweep direction for successive pulses.

The phasing of the sweep voltage relative to the accelerating voltage, and the amplitude of the sweep frequency, are means for controlling the distance that the two electron density distribution maxima in the plane of the window are separated from each other. Thus, by changing the phasing or amplitude, or both, of the deflection frequency, an electron density distribution in the plane of the window can be varied such that a uniform distribution may be obtained at almost any desired distance below the window, and therefore at almost any desired location of the object.

In accordance with the invention, a feature previously considered a disadvantage in the electron beam generator technology has been converted into a means for providing an increase in efficiency of electron beam tube generation. It is known in the art that the overloading of the resonant transformer in an electron beam generator results in the undesired malforming of the electron beam pulse, in that the distribution of the electron beam with respect to time becomes asymmetrical or skewed. This may result in the electron beam density distribution having a sharper rise time than decay time. On the other hand, overloading the transformer provides the desirable result that the electron beam generating unit operates at a higher electron beam current than would otherwise be the case, and thus produces a greater amount of radiation with better depth dosage. Where, as in accordance with the invention, however, the density distribution need not be uniform across the window, an asymmetric electron beam pulse is an advantage, and the disadvantage of overloading the resonant transformer is converted into an advantage. Thus, in the single electron beam tube embodiment providing two apparent or virtual sources of electron beams, the skewed or asymmetric pulse on the first sweep across is axially symmetric to the next succeeding pulse swept across the other side of the window (the term axially symmetric being used in a mathematical sense and the axis being the centerline of the window). Viewed about the short axis of the window, the two swept pulses or electron density distributions, are reflected images of each other. As such, any asymmetry in a given pulse results in a symmetric distribution when viewing two successive pulses. Such a density distribution across the plane of the window provides the requisites for a uniform distribution at a distance below the window. In similar fashion, the asymmetry resulting from the overloaded transformer is an advantage in the embodiment utilizing two separate electron tubes.

Indeed, if the resonant transformer is not overloaded and the electron beam pulses are individually smooth and symmetric, then other means must be resorted to for building up the ends of the density distribution at the window.

In the two separate electron beam tube embodiment, wherein the deflection voltage frequency is the same as the accelerating voltage frequency, the required asymmetry in each pulse may be provided by delaying the biasing grid control pulse to the grid of the tube, relative to the peak of the accelerating voltage sine wave, so that the tube initially fires at or near the peak portion of the sine wave. A similar arrangement may be used in the case of the single electron tube with alternate direction deflection scanning. This results, in essence, in the initiation of the electron beam at or near the maximum of the accelerating voltage sine wave, and continuing on to some point 10 to 90 degrees later, but for most applications, 60 to 90 degrees later. A consequence of such an arrangement is that the electron density is greatest at the beginning of the pulse, and decreases to a lesser value at the end of the pulse. A pulse produced by this type of phasing is smoother than that produced by overloading the resonant transformer, and in that sense may be more desirable for certain conditions. On the other hand, the concomitant improvement in efficiency due to a higher electron beam current characteristic of the overloaded resonant transformer is not present.

It should be understood that of all the methods and means for controlling the electron pulse distribution stated above and to be described below, none are mutually exclusive and any combination or all of them may be used at the same time.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings.

In the drawings:

FIGURES 4 and 4A and 4B are schematic representations of a resonant transformer type of electron beam generator which may be used in the invention;

FIGURES 5A and 5B are illustrative graphical representations of certain phase relationships between the accelerating voltage and grid control pulses of the generator of FIGURE 4;

FIGURE 6 is a plan view of two of the electron beam generators of FIGURE 4 arranged in accordance with the principles of the invention;

FIGURE 6A is a plan view of three of the electron beam generators of FIGURE 4 arranged in accordance with the principles of the invention;

FIGURE 7 is an illustrative graphical representation of an electron density versus time distribution that may be used with the arrangement of FIGURE 6;

FIGURE 8 is an illustrative graphical representation of electron density distributions provided by the embodiment of FIGURE 6;

FIGURE 9 is an illustrative graphical representation of electron density distributions obtained when three electron beam generating tubes are arranged as in FIGURE 6A in accordance with the principles of the invention; and FIGURES 10 and 11 are combined plane views and illustrative graphical representations of a single electron beam tube providing two apparent or virtual sources of electrons in accordance with the principles of the invention.

Figure 1:
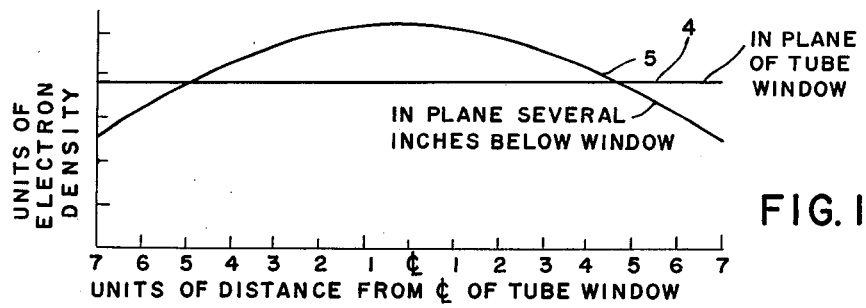
FIGURE 1 is an illustrative graphical representation of an electron density distribution (in accordance with certain prior art arrangements) across the window of the electron beam generator and across a plane parallel to the window at some predetermined distance below the window.
Figure 2:
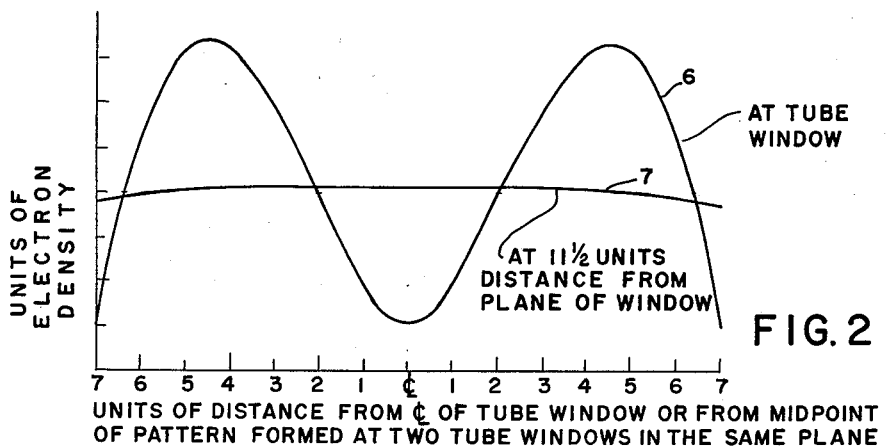
FIGURE 2 is an illustrative graphical representation of electron density distributions provided by and in accordance with the invention.
Figure 3:
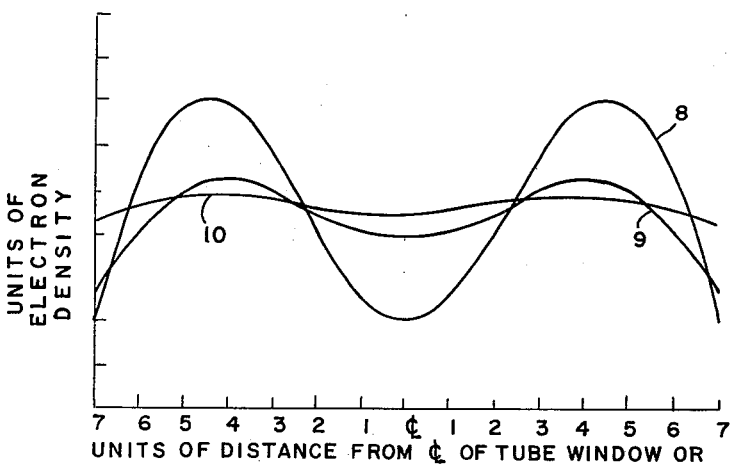
FIGURE 3 is an illustrative graphical representation of electron density distributions at successive distances between the plane of the tube window and the plane of the surface of the irradiated object.

The following discussion is divided into five parts. The first, centered about FIGURE 1, is directed to demonstrating the inadequacy of prior art methods and devices in providing an even irradiation distribution across the plane of the object to be irradiated in certain situations and circumstances of interest. The second part, centered about FIGURES 2 and 3, is directed to demonstrating how, in accordance with the principles of the invention, the required uniform irradiation of the object is achieved by controlling the density distribution in the plane of the tube window in a certain way. The third part, centered about FIGURES 4, 4A, 5A and 5B, is directed to an explanation of the type of electron beam generator used in the preferred embodiments of the invention. The fourth part, centered about FIGURES 6 through 9, is directed to a demonstration of embodiments of the invention wherein the improved results are obtained by utilizing a plurality of separate electron beam generators. Lastly, the fifth part of the discussion below, centered about FIGURES 10 and 11, is directed to the embodiments of the invention wherein a single electron beam generator tube is arranged to operate as a double virtual source of electron beams.

Referring more specifically to FIGURE 1, there is represented therein an electron density distribution at and across the tube window, curve 4, in contrast with the distribution in a plane several inches below the tube window, curve 5. These distributions are characteristic of those obtained in the above mentioned copending patent application of Harold T. Boeker. The ordinate represents units of electron density, so that a comparison of the density distributions in a relative sense may be visualized, while the abscissa represents units of distance left and right from the center line of the electron beam generating tube window, in the plane of the window. The density distribution 4 in the plane of the window is substantially single valued and flat (zero slope) across the length of the window, which accomplishment has been achieved in accordance with the principles of the above mentioned copending applications. At a plane several inches below the window, however, the electron density distribution bunches in the center, curve 5, to provide a non-linear distribution symmetric about the single maximum at the midpoint of the tube window.

This bunching of electrons results from scattering of the electrons when propagating from the tube window through air and particles in the path of the electron beam. Collisions result which may be direct physical interactions or deflections caused by electric or magnetic coaction. The scattering is in the shape of a bell curve, because of the fact that the collisions are essentially elastic in nature, i.e., there is conservation of energy, and as a consequence, any deflection path has equal probability of occurring as any other deflection path. The cumulative effect of the deflections is greatest in the center because of the contributions thereto of the electrons propagating on both sides thereof. At the ends of the distribution, there are no contributions from beyond the edges of the window represented by the seven unit marks at the extreme right and left, since there are no electrons propagating outside this region, and as a consequence, there is no scattering from outside of the seven unit marks to contribute to the ends of density distribution. The scattering effect results in the curve 5. This type of electron density distribution is to be avoided in the plane of the object to be irradiated. Needless to say, the magnitude of irradiation to which the irradiated object is subjected cannot be uniform across the surface plane of the object if the electron density distribution at the surface plane is as represented by curve 5. The graphic representations of FIGURE 1 are characteristic, for example, of a one million electron volt electron beam generator operating at approximately a three milliampere beam current or a two million electron volt generator operating at approximately a five milliampere beam current.

Referring to FIGURE 2, there is presented a graphic demonstration of the improvement in electron density distribution resulting from an application of the principles in accordance with the invention. Thus, in FIGURE 2, curve 6 represents an electron density distribution across the plane of the tube window. Curve 6 is symmetric about the center line of the window, but in each half of the window, the half distribution therein is not symmetrically disposed or centrally located. Thus, to the left of the center line of the window, the point of maximum electron density is located some distance closer to the edge of the window than to the center line. On the right hand side of the window, the half distribution is a mirror counterpart on the left, and thus the distribution across the entire window is symmetric with respect to the center line. Such a distribution as curve 6 at the window results in a distribution in a plane several inches below the window as presented by curve 7. As a result of propagation from the window to the plane of the irradiated object several inches below, the electron density distribution is built up on the center and at the ends to form the relatively flat curve 7. Thus, a severely uneven or nonuniform distribution at the tube window results in a substantially monotonic distribution several inches below, at the plane where it is of paramount importance to have a uniform distribution, namely, the plane of the irradiated object.

The double peaks or humps of curve 6 suggest a double virtual source of electrons or two literally separate sources of electron beams. In actuality, this distribution was obtained from a single electron beam generator providing double virtual electron sources across a single tube window. This distribution is one obtained, for example, from a one million electron volt tube operating at a five milliampere beam current in accordance with the principles of the invention. In this arrangement, curve 7 was obtained at a distance 11½ inches below the plane of the tube window.

In FIGURE 3 may be seen a series of three curves, 8, 9 and 10, which represent density distributions at three successive planes spaced 1¼ inches, 3¾ inches and 8 inches, respectively, below the tube window. Thus, FIGURES 2 and 3 together demonstrate how the scattering of the electrons successively changes the shape of the density distribution as a function of distance. The 11½ inch distance of curve 7, therefore, is the best location for the object to be irradiated when used with the particular electron beam density distribution across the tube window provided by curve 6.

It may be seen from curves of FIGURES 2 and 3 that locating the peaks of the density distribution across the window closer to the edges of the window than toward the center line has an important effect upon the distributions in the planes below the window. This is necessary in order to have the ends of the distribution build up at a rate comparable to that of the center of the distribution. If the peaks were located closer to the center line, the center of the distribution would increase in magnitude much more rapidly than would the ends of the distribution because of the nature of the scattering effect. As a consequence, it would not be possible to obtain a monotonic distribution at any practical distance (depending upon the energy of the electrons) below the plane of the window.

Two literally separate electron beam sources may be used to provide the distribution of curve 6 merely by having each separate source provide the distribution shown on each side of the center line. Thus, the left hand tube would provide the distribution as shown on the left hand side of the center line of FIGURE 2, and the right hand tube disposed immediately adjacent to the left hand tube would provide the second half of the distribution as shown to the right of the center line of FIGURE 2.

Having thus described the desirable results achieved in accordance with the principles of the invention, there will now be described a representative electron beam generator tube used in the embodiments of the invention subsequently to be described.

FIGURE 4 illustrates an electron beam generator including components that enable achieving the preferred beam energy distribution in accordance with the invention. It comprises an evacuated tube 10 in which the electrons are accelerated to high energy. Useful and practical applications exist requiring electron energy levels which may range from .3 to 24 million electron volts. Tube 10 includes a plurality of glass rings 11 which are sealed in end-to-end relationship by intervening metal spacers 12 and it is enclosed at its upper end by a cathode mounting assembly including a focusing electron gun 13 having a hot cathode 14 and a control grid 15. Wires 16 pass through vacuum-tight insulators 17 in order to carry heating current to the cathode 14.

Tube 10 is terminated at its bottom end by a metal ring 18 to which is joined a round metal tube 19 and a flared tube section 20. The flared tube 20 terminates in an adapter 21 that is closed by an electron permeable exit window 22 usually made of very thin titanium, aluminum or other metal of low atomic number. The elements recited in this paragraph constitute the accelerating tube anode and as can be seen at 23, they are ordinarily grounded so as to be at zero potential level with respect to the cathode 14. By this means the electron beam, represented by the dashed line 24, acquires sufficient energy to pass through the window 22 and irradiate a product 25 carried on a conveyor belt 26, for example, below the window.

The electron accelerating voltage is derived from the high voltage secondary winding 30 of a resonant transformer 31. The secondary 30 usually surrounds the accelerating tube 10. At its high potential upper end, winding 30 is connected to one cathode lead 16 and its lower end 32 is grounded at the potential level of the tube anode which is grounded at 23. Suitable taps 33 on the secondary winding are connected with corresponding intermediate electrodes 34 within the tube 10 so as to effect a gradual potential gradient between the ends thereof. More detail on the construction of the resonant transformer and an accelerating tube having the character of that here used as an example are obtainable from U.S. Patent No. 2,144,518.

The accelerating tube 10 and concentrically surrounding resonant transformer windings 30 may be enclosed in a metal tank 27, only a fragment of which is shown in FIGURE 4, and which is filled with a dielectric medium such as oil or pressurized gas.

Means are provided for impressing a biasing potential between cathode 14 and a control grid 15 so that tube 10 will only conduct when the accelerating voltage wave is at or near its positive peaks. Biasing energy is derived from the sinusoidal voltage which appears across the capacitance formed between tank 27 and a cap 37 located above tube 10. The charging current associated with this capacitance voltage is fed into a bias control 40 through a wire 28 from cap 37 and a wire 29 from the high potential end of secondary winding 30. In bias control 40, to be described in greater detail below, as shown in FIGURE 4B, is a rectifier and rectangular pulse forming circuit whose output pulses may be applied in phase with the accelerating voltage between cathode 14 and grid 15 through wires 38 and 39, and the bias is adjusted so the tube will conduct in pulses that occur and persist when the accelerating voltage is at or near the positive peaks of its sine wave curve. The bias control 40 is preferably of the type disclosed in detail in the U.S. Patent No. 2,897,400 of W. F. Westendorp for "Adjustable Bias for Electron Beam Apparatus." It includes means in the form of a variable inductance for varying the phase of the grid bias control pulses relative to the accelerating voltage.

The biasing network 40 as shown in FIGURE 4B comprises a rectifier bridge 118 connected in series with the high voltage terminal of the transformer secondary 30 and the cap 37 to provide a full wave rectified current at output terminals 119 and 120 having the indicated polarity. A reference voltage circuit 91 is connected between terminals 119 and 120 and includes a rectifier 92 or other asymmetrically conducting device in series with a capacitor 93 so that the capacitor is charged by the full wave rectified current from the rectifier bridge 118. A shunt resistor 94 in parallel with capacitor 93 provides a discharge leakage path for the capacitor to establish the steady-state voltage developed on the capacitor. Connected in parallel with the capacitor circuit and in parallel with terminals 119 and 120 is a reactor circuit 96 comprising variable inductance 97 and a series resistor 98. Varying the inductance 97, as mentioned above, serves to vary the phase of the grid control pulse train relative to the accelerating voltage. The output voltage from the biasing network may be applied to the primary winding 99 of a step-up transformer 100, the secondary winding 121 of which is connected between the filament and the control electrode. Since the output voltage of the biasing network supplied to the transformer primary winding 99 has a substantial direct current component, it is necessary to provide a blocking capacitor 124. It is also desirable to provide in the circuit of the secondary winding 121 a direct current voltage restoring circuit. This circuit may taken the form of a capacitor 122 connected in series with the winding 121 and the unilaterally conductive device 123 connected across the winding 121 and capacitor 122 and poled in the proper direction so that it does not suppress the negative voltage peaks produced by the biasing circuit.

The relation of the grid control pulses (and, therefore, in turn the tube beam current pulses) to the accelerating voltage, which appears between cathode 14 and window 22, may be seen in FIGURES 5A and 5B. The accelerating voltage curve 44 may have an amplitude in the range of over one million volts and a frequency of 180 cycles per second, in this instance. Since the tube 10 conducts only when the anode or window 22 is positive with respect to the cathode 14, current pulses resulting from grid control pulses 45 or 46 appear only during the positive half cycles of the accelerating voltage. By proper adjustment of the bias circuitry, the current pulses may be biased to cut-off until voltage curve 44 reaches a value near or at its peak, at which time a substantially but not perfectly rectangular wave current pulse is formed (as shown by the intersections of the extensions of pulse sides 45 or 46 with curve 44) out of what would usually be a sinusoidal current wave form were it not biased. It is of importance to note that the symmetry of electron current pulses resulting from control pulses 45 is not desirable in certain embodiments in accordance with the principles of the invention, and instead, skewed or asymmetric pulses resulting from control pulses 46 of FIGURE 5B are preferable, as will be demonstrated in greater detail below. The skewed electron current pulses are readily obtained by changing the phase of the grid control pulses relative to the accelerating voltage in the bias control 40 of FIGURE 4. It may be noted that the time scale of FIGURE 5B demonstrates that the skewness of pulses 46 is such that the greatest magnitude in the distribution occurs at the beginning of the pulse. In this example, the current pulse width may be taken as between 60° and 90° on the 180 cycle per second time scale for convenience, although a different conduction angle may be desirable in other cases. Thus, only the electrons possessing nearly the highest possible energy are conducted and window heating is reduced since the low energy electrons are not present to be absorbed in the window 22 and manifested as heat.

The resonant transformer 31 includes a primary winding 46 of relatively few turns compared with the secondary, which primary is supplied with current through an amplitude control, symbolized by the device 47, which is in this case, supplied from a 180 cycle per second generator 48. Generator 48 includes the usual excitation controls (not shown) and is mechanically driven by a schematically represented synchronous motor 49.

In the present invention, the voltage from frequency control circuit 54 is applied to means for scanning the electron beam 24 over the long dimension of window 22 where the beam spot executes movement on the window. The scanning means may be electrostatic but in this case they preferably take the form of electromagnetic coils 50 located on opposite sides of anode tube 19.

Another set of scanning coils 59, at right angles to coils 50, are energized by a high frequency voltage which develops a flux that deflects the beam spot 56 extremely rapidly across the narrow dimension of the window 22 during each current pulse. Any suitable conventional oscillator (not shown) may be used to supply coils 59. In one commercial model where the window is scanned at 180 cycles per second along its long dimension, the cross scan frequency is in the range of 200 kilocycles per second. Generally, however, the cross scan frequency may be selected in view of the beam spot diameter, the window size and the desired amount of overlap of the beam spot. This will, in turn, usually be governed by the character of the product being irradiated, the rate at which it is conveyed, and its dosage requirements.

Scanning the beam in two directions is established procedure, the result desired being to distribute the electron beam as uniformly as possible, by superposition of the scanning movements, over articles such as 25 which are being irradiated in FIGURES 4 and 4A. The articles may be stationary or transported on a conveyor belt 26 in order to remove them from the radiation field after they have received a predetermined dose.

According to prior practice, and as may be done in certain embodiments in accordance with the invention to be described in greater detail below, it is customary to scan the beam on the long window dimension by a voltage derived from the resonant transformer at the same frequency as the current pulse rate and the accelerating voltage. The longitudinal deflection voltage (i.e., longitudinal to the long axis of window 22 but transverse to the direction of motion of the object 25 on belt 26) for scanning the beam across the tube window 22, may be obtained from the secondary winding of the resonant transformer by the voltage pickup plate 36 and thence through frequency control circuit 54 to the electromagnetic deflection coils 50. In the embodiment of the invention of FIGURES 6 through 9, to be described below, the frequency control circuit 54 may be shunted out since the scanning frequency may be the same as that of the accelerating voltage, i.e., 180 cycles per second. A variable resistor 55 serves to control the amplitude of the scan voltage exciting deflection coils 50, while a variable phase shifter 51, which may be a standard RC phase shifting circuit, serves to control the phase of the deflection voltage relative to the accelerating voltage. Both the phase and amplitude controls 51 and 55 may be used to provide the asymmetry in the density distribution in accordance with the invention, as will be described below.

In other embodiments of the invention as represented in FIGURES 10 and 11 to be discussed below, the frequency control circuit 54 is a frequency divider which halves the 180 cycles per second accelerating voltage frequency coupled from the secondary coil of the resonant transformer through voltage pickup plate 36, and delivers a 90 cycles per second scan frequency to deflection coils 50. A particularly advantageous frequency divider for circuit 54 is obtained in manner well known in the art by using synchronized astable multivibrators which may be locked to the desired submultiple of the 180 cycles per second frequency. The use of such synchronized multivibrators in frequency division circuits is well known in the art and described in standard textbooks, for example, "Radio Engineering Handbook," edited by Keith Henney, McGraw-Hill Book Co., 5th ed., pages 16–58.

FIGURES 6 through 9 are directed to the embodiment of the invention utilizing a plurality of separate electron beam generating tubes which, in combination, in accordance with the principles of the invention, provide the required nonuniform density distribution across the plane of their combined windows. This, in turn, results in the desired uniform distribution at a plane therebelow coinciding with the surface plane of the irradiated object. More specifically, FIGURE 6 discloses two electron beam generating tubes of precisely the same type as described above in detail in FIGURES 4 and 4A. Only the flared lower portion of the tubes are presented, however, for the purpose of showing the spatial relationship of the windows of the two tubes relative to the irradiated object. In all instances, similar parts will be given similar reference numeral designations with ′ and ″ following the reference numerals for indicating first and second related devices.

The two tube windows, 22′ and 22″ of the two electron beam generating tubes are disposed with their windows in a common plane and the long dimensions of the windows colinearly aligned such that the sum of the two long dimensions of windows 22′ and 22″ is approximately equal to the transverse dimension of the test object 25′, which passes under the windows for purposes of being irradiated. As in FIGURES 4 and 4A, the object 25′ is transported under the electron beam tubes by means of a conveyor belt 26′. In this arrangement, the test object 25′ and the conveyor belt 26′ are approximately double the width of their counterparts in FIGURES 4 and 4A. The use of the two separate electron beam tubes is indicated when the object to be irradiated is especially wide and in particular, has a width greater than could be encompassed by the scan of a single electron beam tube.

It may be noted that the electron beams 24′ and 24″ are deflected across the length of their respective tube windows in opposite senses to each other at any particular point in time. Although such a synchronization of the electron beam deflection is not essential to the operation of this embodiment, it facilitates comprehension of the following description.

In one mode of operation of the embodiment of FIGURE 6, the longitudinal deflection or scan voltage frequency for each of the tubes is 180 cycles per second, i.e., the same frequency as the accelerating voltage. Other frequencies may be used, however, if other reasons such as tube loading dictate. As a consequence, the frequency control of circuit 54 shown in FIGURE 4 is shunted out or adapted for operation at the same frequency as the voltage coupled from the secondary coil of the resonant transformer. In this type of scanning operation, the electron beam pulses or bursts are deflected across the length of the window such that the electrons at the beginning of the pulse commence at the left hand edge of window 22′ and the electrons at the end of the pulse terminate at the right hand edge of window 22′. Thus, the entire electron pulse is made coextensive with the window length, in that each pulse sweeps the entire window. The windows 22′ and 22″ meet at a common point on line 61, i.e., the right hand edge of 22′ and the left hand edge of 22″ join at line 61. The second electron beam is scanned across window 22″ in similar manner, but in opposite sense. Thus, the leading edge of the electron pulse commences to be swept across window 22″ at the right hand edge thereof and the terminal end of the electron pulse coincides with the left hand edge of window 22″ at line 61. Because of the relationship of the deflection voltage frequency to the accelerating voltage frequency, all of the electron pulses swept across window 22′ are swept always in the same sense, and all the pulses across window 22″ are swept across that window in the same sense, which is opposite, however, to the sense of deflection across window 22′. Having the leading and trailing edges of the electron pulses coincide spatially with left and right hand edges of the windows is readily achieved, as is well known to those skilled in the art, by adjusting the phase and amplitude of the deflection voltages, and is done in the instant electron generator tubes by virtue of the amplitude control 55 and phase control 51.

Consider now the operation of FIGURE 6 when the phase relationship of the grid control pulse to the accelerating voltage is such as shown in FIGURE 5A. In this arrangement, the grid control pulse fires the tube over a period which coincides with the symmetrical maximum of the accelerating voltage. The wave forms of FIGURE 5A are appropriate when the resonant transformer of the electron generating tube is not overloaded. However, when the resonant transformer is overloaded, the symmetry of the pulses shown in FIGURE 5A is lost. Distorted electron beam pulses result from overloading, and the distortion takes the form of a skewing of the pulse toward the leading edge thereof. Thus, the electron beam generated has a greater density at the earlier part of the pulse than at the end. Stated another way, the decay time of the electron beam pulse in terms of density is longer than the rise time.

FIGURE 7 represents the type of electron density distribution generated with respect to time as a consequence of overloading the resonant transformer. Overloading the transformer is desirable in that higher electron conduction currents result. The electron density distribution with respect to time corresponding to each electron beam pulse 66 is translatable into an electron density distribution across the window of the electron beam tube. Thus, window 22′ deflects the electron beam pulse with the rising or lead edge of the pulse at the left hand edge of window 22′ and the terminal part of the pulse at the right hand edge of window 22′ corresponding with line 61. Similarly, an electron beam from the second tube is deflected across window 22″ with the leading edge of the electron beam pulse corresponding to the right hand edge of 22′ and the tail end of the electron beam pulse corresponding to the left hand edge of 22′ at line 61.

FIGURE 8 shows the electron density distribution across the combined lengths of windows 22′ and 22″. It may be noted that the distribution has two maxima and that the distribution 62 on the left hand side of line 61 which corresponds to the distribution across window 22′, is the mirror image of the density distribution 63 on the right hand side of line 61, which corresponds to the distribution across window 22″. It may be noted that this distribution is substantially the same as that of curve 6 in FIGURE 2 and is the desired type of distribution at the plane of the tube window in accordance with the principles of the invention. Curve 64 of FIGURE 8 represents the density distribution at the surface of object 25' (of FIGURE 6) and is the result of the 62—63 distribution being scattered during propagation over the interval between the plane of the tube windows and the surface plane of object 25'.

The overloading of the resonant transformer in this mode of operation was utilized for the purpose of providing the asymmetrical electron density distribution across each of the tube windows 22' and 22''. Thus, each pulse for each window is asymmetric about the center line of each window, but symmetric about the line 61. Overloading the resonant transformer need not necessarily be the mechanism relied on for providing the required asymmetry. In lieu of this, for example, the phase relationship of the grid control pulse may be related to that of the accelerating voltage in the manner presented in FIGURE 5B above. The asymmetry resulting from pulses 46 of that figure provide the required asymmetry to load the windows in the manner shown in FIGURE 8. This type of phasing is readily achieved in the manner described above by means of the bias control 40 by virtue of the variable inductor phase control device included therein and discussed in greater detail in the above mentioned Westendorp Patent No. 2,897,400.

The phasing of FIGURE 5B provides another advantage related to providing uniform depth dosage across the irradiated object. In addition to uniform electron density which determines primarily the beam current, the penetration capability or hardness of the electrons which is determined primarily by beam voltage, is involved in providing uniform depth dosage, i.e., uniform energy distribution or uniform irradiation across the irradiated object. With the phasing of FIGURE 5B, the leading edges of the electron beam pulse have a concentration of the harder electrons since the accelerating voltage is greater at this point than at the trailing edge of the pulse. As a consequence of building up harder electrons toward the edges of the window, the beam voltage which ordinarily would fall off rapidly with distance from the window at the ends of the electron beam corresponding to the edges of the window, results in a uniform beam voltage distribution at the irradiated object. With uniform beam current and beam voltage at the object, the penetration is uniform and the desired uniform energy distribution is provided.

A very simple way of controlling the shape of the density distribution in the plane of the tube windows is to move the two tubes and thus their windows relative to each other. By spacing windows 22' and 22'' from each other (and from line 61) in FIGURE 6 in the direction of their long dimension, their density distributions 62 and 63 are varied in that the maxima of these two curves are spaced farther from each other. In this way, wider objects may be irradiated than is possible with the windows in contiguous relation at 61, and control of the shape of the electron density distribution is partially a function of the spacing between the windows.

The double electron tube embodiment of FIGURE 6 may be modified to irradiate even wider objects than that of 25' shown in FIGURE 6. Consider an object which is one and one-half times as wide as 25'. In such a situation, reliance may be had upon three electron tubes disposed side by side, with the long dimensions of their windows being colinearly aligned, as represented by tubes 103, 104 and 105 in FIGURE 6A. In such an arrangement, the electron density distribution of the two end windows 103 and 105 is precisely the same as that shown in FIGURE 8. However, the middle one of the three windows should have a symmetric density distribution across its window in order to provide the desired effect. Thus, FIGURE 9 represents the type of density distribution which should appear across the plane of the combined three tube windows of FIGURE 6A. The left and right hand distributions 67 and 68 may be achieved in any of the two arrangements discussed above with respect to FIGURE 6. The middle distribution 69 which is completely symmetrical within its own window area, may be readily achieved in accordance with the obvious techniques known to the prior art. Thus, the operation is such that the resonant transformer is not overloaded and the phase relation of the grid control pulses and the accelerating voltage is shown, for example, in FIGURE 5A. The combined distribution of FIGURE 9, then, provides, as a result of scattering between the plane of the window and the test object below, a uniform distribution as is shown by curve 66.

For objects to be irradiated which are even wider than the object that could be accommodated by the distribution of FIGURE 9, four and even more electron beam tubes may be arranged side by side and controlled to provide the required varied electron density distribution across the plane of the window. In any event, the two end tubes may have the asymmetric distribution shown in FIGURE 8 and FIGURE 9 in the plane of the windows, so that the ends of the combined distribution remain of sufficiently great magnitude to maintain the combined distribution flat at the plane of the surface of the object.

To increase ease of visualization and readiness of comprehension of the embodiment of FIGURE 6, the operation of the two tubes was described in a synchronized sense, that is, the sweeps of the tubes were described as being simultaneously traveling in opposite senses. This is in no means essential to the operation of the embodiment of FIGURES 6 through 9, since the essential requirement for the density distribution at the surface of the object is that it be an even density distribution over a period of time sufficient for the object to be irradiated. Thus, what is of significance in the application of the invention is that the integrated density distribution over the period of time required to irradiate a given portion of the object be a flat distribution across the plane of the object. In FIGURE 6, that which is required is the asymmetric pulse be swept from left to right across window 22' and from right to left across window 22'', but not necessarily that the sweep of the pulse in each be during the same half-cycle of the deflection voltage.

The remaining FIGURES 10 and 11 now to be described, are directed to the embodiments of the invention wherein a single electron beam generating tube provides double virtual sources of electrons by providing on a single tube window two spatially separated concentrations of the electron beam density distribution.

FIGURE 10 represents an embodiment utilizing the same electron beam generating tube described in FIGURES 4 and 4A. Accordingly, the portions of the tube shown are given like reference numerals. In FIGURE 10, the curve 71 is a graphic representation of the deflection sweep voltage having certain characteristics soon to be described. The vertical direction relative to curve 71 represents the time ordinate, while the horizontal direction performs a dual representational function. It represents the amplitude of the deflection voltage, and also represents position along window 22 where the beam spot appears as a consequence of the instantaneous magnitude of the deflection sweep voltage. To the right are two sets of curves, 72 and 73. Curves 72 and 73 are spatially correlated to curve 71 in a manner soon to be described. Curve 72 represents the accelerating voltage sine wave which has a 180 cycles per second frequency. Curve 73 represents the bias grid control voltage pulses. Curves 72 and 73 convey the same type of information as presented in FIGURE 5B above. Relative to curves 72 and 73, as was the case with curve 71, the vertical direction is the time ordinate with time increasing in the downward direction. The horizontal direction represents the magnitude of the curves 72 and 73. This type of representation is well known in the art and is particularly suited for demonstrating the interrelationship of the accelerating voltage, the grid control pulses and the deflection sweep voltage as a composite in its effects upon the electron density distribution across the tube window 22.

In this embodiment of the invention, the deflection sweep voltage is 90 cycles per second, and thus one-half the frequency of the accelerating voltage. This frequency is obtained as described above in connection with FIGURE 4, in that the frequency divider in the control circuit 54 of that figure locks the deflection voltage frequency to one-half that of the accelerating voltage. The 90 cycle per second frequency is of considerable importance in this embodiment, since it makes possible the utilization of the single electron tube to provide two virtual sources of electrons. The control grid pulses 73 are phased relative to the accelerating voltage 72 in the manner shown in FIGURE 5B, such that the leading edge of the control pulse coincides with the maximum point on the positive half of the accelerating voltage cycle. As was discussed above, this is one way of obtaining an asymmetric electron beam density distribution pulse.

As may be seen from FIGURE 10, the dashed lines 74 and 75 indicate the effective portion of the deflection voltage occupied by the electron beam that is generated Thus, the leading edge of the electron beam pulse coincides with that deflection voltage which starts the electron beam at the right hand edge of window 22, while line 75 demonstrates that the tail edge of the electron beam pulse coincides with the deflection voltage that terminates that portion of the beam at the midpoint of tube 22. In this way, the first pulse considered commences its deflection at the right hand edge of window 22 and terminates in a half sweep at the midpoint of the tube. The next deflection occurs in the opposite sense with the next succeeding pulse. Its relationship to the deflection voltage is as shown by lines 76 and 77, wherein the leading edge of the next succeeding pulse commences at the left hand edge of tube 22 and then proceeds to the midpoint of the tube, where it is terminated.

The overall result is that succeeding electron beam pulses are swept across the tube window in opposite senses, and each occupies only one-half of the tube window length. Any two successive electron beam pulses form a single combined distribution similar to that of curve 6 in FIGURE 2 or curve 62—63 of FIGURE 8, except that the distribution resulting from the device of FIGURE 10 is across a single tube window, rather than across the two tube windows in the embodiment described by FIGURE 8. Since the same type of distribution across the tube window is provided in FIGURE 10, it is also the case that at the specified distance below the tube window, the electron beam density distribution is also flat.

In addition to using the phase relationship of the accelerating voltage to the grid control pulses, or the overloading of the resonant transformer, to provide the skewed or asymmetric pulse arrangements in accordance with the invention, the amplitude of the deflection sweep voltage, curve 71, may also be relied upon for providing the skewed electron beam distribution on opposite sides of the tube window 22. As was discussed above, the amplitude of the deflection sweep voltage may be controlled as in FIGURE 4 by the variable inductive element 55 coupling the control circuit to the electromagnetic deflection coil 50.

When the object to be irradiated is small and passes under a small portion of the window, it is advantageous and efficient to concentrate the beam at that area and to require monotonicity of the electron density distribution only at the object itself. This may be readily accomplished by using any of the controllable parameters discussed above to move the maxima of the density distribution in the plane of the window closer to each other. Thus, in FIGURE 2 or 8, the maxima of curve 6 or of curves 62 and 63, may be moved so as to be closer to the center line than to the edges of the window, or moved to any spacing therebetween depending on the width of the object to be irradiated.

FIGURE 11 demonstrates such an arrangement wherein the amplitude of the deflection voltage is utilized for providing the skewness required in the electron beam distributions. In FIGURE 11, the accelerating voltage and the control grid pulses are phased unlike that of FIGURE 10. In FIGURE 11, the midpoint of the control pulses 83 coincide with the positive maxima of the accelerating voltage sine wave 82, as for example in FIGURE 5A. The electron beam density distribution could not therefore be skewed solely because of the relationship of these two curves. On the other hand, it may be noted that the 90 cycle per second sweep voltage 81 has an amplitude substantially less than that of curve 71 in the preceding figure. By decreasing the amplitude of the sweep voltage as in curve 81, the leading edges of the control pulses 83, as shown by the dashed line 84, coincide with a point on the sweep voltage whose magnitude is sufficient to deflect the beam near to the right hand edge of tube window 22. Between the point where curve 84 intersects the sweep voltage curve and the point on the sweep voltage curve which indicates the required magnitude for deflection of the beam close to the right hand edge of the tube window, the electron beam pulse generated by the tube remains near the right hand edge of the tube window. As a consequence, the electron density increases or builds up over that part of the electron beam pulse near the right hand edge of the window. Therefore, the roughly symmetrical pulse that would be produced solely because of the phasing of curves 82 and 83 nevertheless results in a skewed distribution because the deflection voltage amplitude keeps the leading or initial edge of the electron beam pulse near the right hand edge of the tube window an extra length of time. In similar fashion, the next succeeding pulse builds up near the left hand edge of the tube window 22 in precisely the same manner, and provides the same type of skewed electron beam density distribution, but for the other side of the tube.

The embodiments of the invention in accordance with FIGURES 10 and 11 rely upon a frequency relationship of accelerating voltage to sweep voltage of two to one. This is a particularly effective relationship when the grid control pulse occupies 60 to 90 degrees of the accelerating voltage sine wave. When, however, narrower grid control pulses are used or otherwise prove advantageous, a 270 cycle per second sweep voltage, or one and one-half times the accelerating voltage, is better indicated. As a general proposition, the sweep voltage frequency should be an $N/2$ multiple of the accelerating voltage frequency, where N is any odd integer; the narrower the control grid pulse, the larger N should be. In most practical applications, however, the 90 cycle per second sweep frequency is best, i.e., where N equals 1.

It may be seen from all of the preceding embodiments of the invention, that the amplitude and the phase of the sweep voltage frequency relative to the accelerating voltage constitutes a control of the skewness of the electron beam pulses required for the non-uniform distribution across the plane of the tube window. Other such controls are the phase relationship of the grid control pulses to accelerating voltage and the amount of overload on the resonant transformer. It follows, therefore, that these controls are also means for controlling at what distance below the tube window a uniform or monotonic electron density distribution can be initially obtained, and therefore at what distance below the tube window the surface of the object to be irradiated should be located. As a general proposition, the more asymmetric or skewed are the two pulses (irrespective of whether they are from separate electron beam generating tubes or from two virtual sources), the greater will be the distance below the tube window at which a uniform density distribution across a given plane will develop, and the converse is true. It should be understood that increasing the skewness or asymmetry of each of the electron beam pulses increases the distance between the maxima of the two beam pulses in the plane of the tube window. This spacing, which, when combined with the statistical electron scattering discussed in detail above, produces the subsequent leveling out of the density distribution in a plane below the tube window. Where the irradiated object is of irregular shape and an irregular density distribution or depth dose conforming to the object's shape is desired rather than a uniform distribution or dose, the above parameters may be controlled in accordance with the principles of the invention to provide such a distribution or dose.

There is an advantage, thus far not explicitly mentioned, which accrues from all embodiments of the invention when the accelerating voltage is phased relative to the control grid pulses in the manner of FIGURE 5B or curves 72—73 of FIGURE 11. This phasing can result, as may be seen from FIGURE 10, in having the peak energy electrons at the edges of the window and the softer electrons in the center of the distribution. As a consequence, the harder electrons near the edges will disperse less, and as a consequence of scattering at a large distance from the window, will spread out eventually to provide a monotonic distribution at that distance which is actually wider than the long dimension of the tube window itself.

While we have shown particular embodiments and methods of our invention, it will be understood that many modifications may be made without departing from the spirit thereof, and we contemplate by the appended claims to cover any such modifications as fall within the true spirit and scope of our invention.

What we claim is:

1. A method for providing substantially uniform charged particle irradiation across an object to be irradiated comprising the steps of: placing the object to be irradiated at its closest point a distance from the output window of a charged particle generating tube; and deflecting the charged particle beam of said tube in a pattern over said window to form a non-uniform charged particle density distribution in the plane of said window having two maxima spaced from each other and on opposite sides of the midpoint of said distribution.

2. A method as recited in claim 1 including the step of adjusting the distance between said maxima in said plane of said window to provide a monotonic density distribution across a plane intersecting said object to be irradiated.

3. A method as recited in claim 1 including the step of forming a minimum in said distribution at the midpoint of said distribution in said plane of said window.

4. A method as recited in claim 1 including the step of spacing each of said maxima closer to an end of said distribution than to the midpoint of said distribution in said plane of said window.

5. A method as recited in claim 4 including the step of spacing said maxima substantially equidistantly from the center of said window.

6. A method as recited in claim 1 including the steps of varying, with respect to time, the energy level of the charged particles generated in said tube and applying the highest energy level particles closer to the edges of said tube window than to the center of said tube window.

7. A method for providing substantially uniform charged particle irradiation across a plane intersecting a portion of an object to be irradiated, comprising the steps of: moving an object to be irradiated in a given direction; placing first and second charged particle generating tubes adjacent to each other with their output windows on the same side of said object and directed toward said object; adjusting each of said tubes to render substantially equal in amplitude the charged particle density distribution at said object provided by each of said two tubes; forming an asymmetric non-uniform charged particle density distribution across each of said windows; and conforming the shape of one of said distributions across one of said windows to be congruent to the shape of said other distribution across the other of said windows.

8. A method as recited in claim 7 including the step of overloading the resonant transformers coupling the accelerating voltage to said tubes to obtain said asymmetric non-uniform density distribution across each of said tube windows.

9. A method as recited in claim 7, including the step of adjusting the magnitude of at least one of the following parameters to obtain said asymmetric distribution across each of said windows: the deflection voltage for deflecting the electron beam across said windows, the phase of said deflection voltage relative to the accelerating voltage exciting said tubes, and the phase of the control grid pulses coupled to the grid of said tubes relative to said accelerating voltage.

10. A method for providing substantially uniform charged particle irradiation across a plane intersecting a portion of an object to be irradiated, comprising the steps of: forming a charged particle density distribution across the window of an electron beam generating tube; conforming the said density distribution across a first half of said window to a skewed non-uniform shape, conforming said distribution across the other half of said window to the shape of a mirror image of said shape across said first half of said window; said forming and conforming steps being implemented by deflecting the charged particle beam of said tube in a pattern over said window to obtain said density distribution; and moving an object to be irradiated by said tube through the beam emitted through said window by said tube.

11. A method as recited in claim 10, including the step of deflecting the electron beam produced by said tube across said window at a frequency equal to one-half the frequency of the accelerating voltage exciting said tube.

12. A method as recited in claim 10 including the step of deflecting the electron beam produced by said tube across said window at a frequency equal to $N/2$ multiplied by the frequency of the accelerating voltage exciting said tube, where N is an odd integer.

13. A method as recited in claim 10 including the step of overloading the resonant transformer coupling the accelerating voltage to said tube to obtain said skewed non-uniform density distribution across said first half of said tube window.

14. A method as recited in claim 10 including the step of adjusting the magnitude of at least one of the following parameters to obtain said skew shaped distribution across said first half of said window: the deflection voltage for deflecting the electron beam across said window, the phase of said deflection voltage relative to the accelerating voltage exciting said tube, and the phase of the control grid pulses coupled to the grid of said tube relative to said accelerating voltage.

15. Charged particle beam generating apparatus comprising: first means for generating and accelerating charged particles and causing said charged particles to exit from said apparatus through a plane at one end of said apparatus; and second means comprising charged particle beam deflecting means for shaping the charged particle density distribution in said plane, integrated over a finite period of time, to have two maxima spaced from each other and on opposite sides of the midpoint of said distribution.

16. An electron beam generating device comprising: an electron beam generating tube having a window through which electrons exit said tube; means for generating an electron beam comprising bursts of electrons having a given repetition frequency and for directing said beam through said window; means for cyclically deflecting said beam across said window in a given direction with a frequency equal to said burst repetition frequency multiplied by the factor $N/2$ where N is an odd integer; means for phasing said deflection frequency relative to said repetition frequency so as to deflect succeeding electron bursts in alternate directions across said window; and means for shaping the electron density distribution across said window resulting from any two succeeding bursts of electrons to have a minimum at the center of said window and a maximum on each side of said minimum.

17. Charged particle beam generating apparatus comprising: first means for generating and accelerating charged particles and causing said charged particles to exit from said apparatus through a plane at one end of said apparatus; said first means being a first electron beam tube having a window in said plane; and second means for shaping the charged particle density distribution in said plane, integrated over a finite period of time, to have two maxima spaced from each other and on opposite sides of the midpoint of said distribution; said second means being a second electron beam tube, also having a window in said plane, in combination with said first electron beam tube.

18. Electron beam generating apparatus comprising: first and second electron beam generating tubes, each having an output window through which an electron beam exits the tube and means for deflecting said beam periodically across said window in a given direction; said first and second tubes having the same electron beam voltage and current generating capacities; said first and second tubes being disposed adjacent to each other in said given direction; means for moving an object to be irradiated by said tubes across the path of the beams from said tubes at a distance from said windows and in a direction perpendicular to said given direction; and means for forming the electron density distribution across each of said tubes resulting from said deflected electron beam asymmetrically across each of said tubes and shaped as the mirror image of the other.

19. Apparatus as recited in claim 18, including a third electron beam generating tube, said third tube disposed adjacent to and between said first and second tubes; and means for forming the electron density distribution symmetrically across the window of said third tube.

References Cited in the file of this patent

UNITED STATES PATENTS

| | | |
|---|---|---|
| 2,680,815 | Burrill | June 8, 1954 |
| 2,724,059 | Gale | Nov. 15, 1955 |
| 2,866,902 | Nygard | Dec. 30, 1958 |
| 3,056,024 | Gale | Sept. 25, 1962 |